United States Patent Office 3,520,697
Patented July 14, 1970

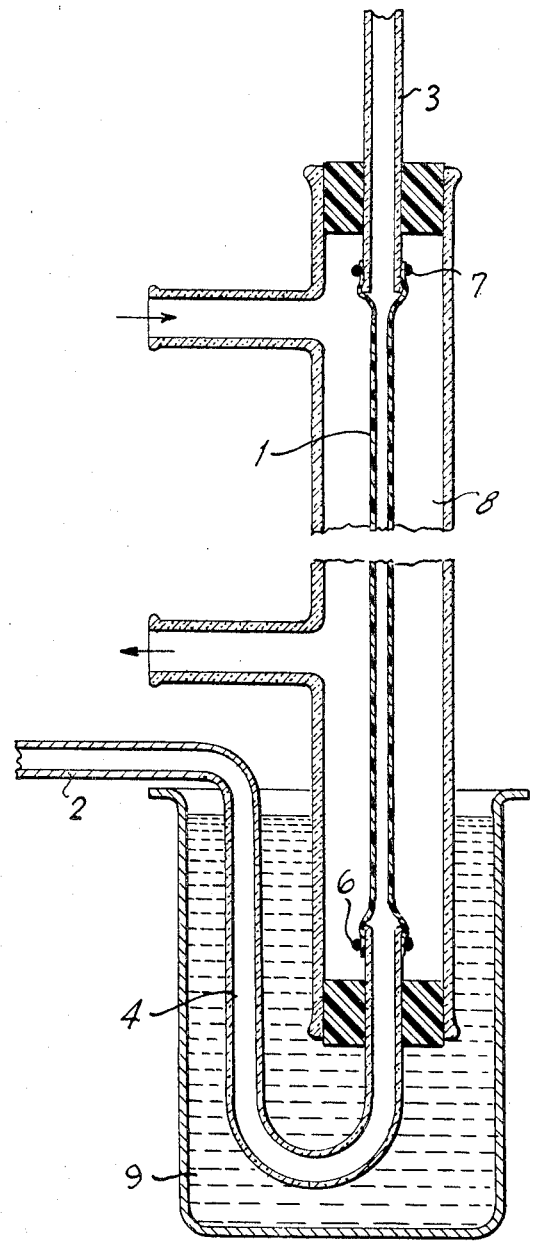

3,520,697
CONTINUOUS PRODUCTION OF CURD
Norman James Berridge, Reading, England, assignor to National Research Development Corporation, London, England, a British corporation
Filed Mar. 18, 1968, Ser. No. 713,876
Claims priority, application Great Britain, Mar. 20, 1967, 12,877/67
Int. Cl. A23c *19/02*
U.S. Cl. 99—116                14 Claims

ABSTRACT OF THE DISCLOSURE

A process for the continuous production of curd which comprises the steps of renneting milk at a temperature such that rennet action can occur without curd formation, holding the milk at that temperature at least until rennet action is nearing completion or is complete and contacting the renneted milk with one surface of a semi-permeable membrane, the other surface of which is in contact with water at elevated temperature so that the milk is heated to a temperature at which curd formation can occur.

---

This invention relates to a process for the continuous production of curd.

A difficulty which is usually encountered in processes for the continuous production of curd is that due to the continuous nature of these processes the milk is usually moving during curd formation, and this movement causes a reduction in the amount of fat retained in the curd. It is known that if rennet is added to milk at low temperature rennet action occurs without formation of curd, and that if the cold renneted milk is then heated coagulation takes place rapidly. Processes have been devised using this effect to enable coagulation to take place quickly, thus reducing the effect of disturbance during coagulation. These processes have involved passing the cold renneted milk over a heated surface in the form of a thin film. A disadvantage which has been encountered is that the curd tends to stick to the heated surface. The process according to the present invention helps to overcome this difficulty.

A process for the continuous production of curd according to the present invention comprises the steps of renneting milk at a temperature such that rennet action can occur without curd formation, holding the milk at that temperature at least until rennet action is nearing completion or is complete and contacting the renneted milk with one surface of a semi-permeable membrane, the other surface of which is in contact with water at elevated temperature so that the milk is heated to a temperature at which curd formation can occur.

The invention also comprises apparatus for the continuous production of curd which comprises means for supporting a semi-permeable membrane, means for causing milk to flow over one surface of the semi-permeable membrane, means for contacting the other surface of the semi-permeable membrane with water at elevated temperature and means for cooling the milk before it comes into contact with the semi-permeable membrane.

The milk should be contacted with the membrane in such a form that the milk is rapidly heated throughout its bulk to the required temperature, for example in a form in which its surface area is large compared with its volume. For example, the membrane can be in the form of a thin tube through which the milk is caused to flow. Alternatively, two sheets of membrane placed close together to form effectively a flat tube can be used or the milk can be flowed as a thin layer over a sloping sheet membrane. Regenerated cellulose (Visking dialysis tubing) and collodion (cellulose nitrate) are suitable materials for the membrane.

A plurality of membrances arranged in parallel and fed from a common source can be employed to increase the throughput of the apparatus. When this arrangement is used means should preferably be provided to ensure that the rate of feed to all the membranes is the same. For example, when the membranes are in the form of tubes having small diameter the connection from the common source to each membrane tube may be via a capillary tube which limits the rate of flow of the milk to the required degree.

The milk can first be inoculated with a suitable starter culture such as streptococcus thermophilus and its pH adjusted to between the natural pH and 5.7, for example between 6.1 and 6.3. For cheddar cheese the preferred pH is between 6.2 and 6.3. The milk is then cooled, for example, to a temperature between 0° C. and 10° C., and treated with rennet, and is held at this temperature at least until the specific rennet action is nearing completion or is complete as shown by coagulation when a drop of milk is allowed to fall from a height of 2 mm. into water at 50–60° C. If desired the milk can be held at the holding temperature for times considerably in excess of the minimum time needed for the completion of rennet action. A long holding time may modify the properties of the curd. The milk is then brought into contact with the membrane, preferably by flowing it over one surface of the membrane, while hot water is flowed over the other surface of the membrane. During this stage the milk should be heated to a temperature sufficient to cause clotting but not so high as to kill the starter culture or to cause protein to be deposited from the whey, e.g. to a temperature between 30 to 50° C. In some circumstances, e.g. when making soft cheeses, the starter can be added at a later stage in the process and then the milk can be heated to temperatures above those at which cultures are killed. The required temperature of the water on the other side of the membrane will depend on the length of time that the milk is in contact with the heated membrane, on the initial temperature of the milk, the nature and thickness of the membrane, and rate at which the water flows over the membrane. Preferably the membrane should not be heated at the point where the milk first comes into contact with it, so that the milk flows over the surface of the membrane for a short distance before coming in contact with the heated part of the membrane where curd formation occurs and and the tube or ducts leading to the membrane do not become heated. This ensures that curd formation does not occur in the tube or ducts leading to the membrane.

The amount of curd sticking to the membrane surface is decreased particularly greatly if the water is acidified. Phosphoric acid or hydrochloric acid may be used for acidifying the water. Even when acidified water is used a small amount of protein may stick to the membrane, and it may be necessary periodically (say every 8 hours) to interrupt the milk flow and flush the membrane with water followed by an acidic or alkaline cleansing solution. If any further particles of protein remain stuck to the membrane treatment with pepsin solution may be required. The hot water may be recirculated, but should be changed from time to time.

A specific embodiment of the invention will now be described with reference to the accompanying drawing, which is a sectional view of apparatus for use in a process for the continuous production of curd.

A vertical tube of semi-permeable membrane 1 is joined at its upper and lower ends to glass tubes 2 and 3 respectively. The tube 2 has U-shaped portion 4. The ends of the tube 1 are slipped over the ends of the tubes 2 and 3 and held in place by rubber rings 6 and 7. The internal diameter of tube 1 is slightly smaller than the internal diameter of tube 3 so that the curd is not forced against the edge of the tube 3. The tube 1 and a short length of each of the tubes 2 and 3 are enclosed in a water jacket 8. The U-shaped portion 4 of the tube 2 and part of the water jacket 8 are immersed in a cooling bath 9. The water jacket 8 is immersed to a depth such that the end of the tube 1 is below the surface of the cooling fluid in the cooling bath 9. The tube 1 is 3 feet long, and is made of ¼ inch diameter Visking tubing.

In operation, the bath 9 is kept at 0 to 10° C., and tap water containing 0.105% (w./v.) phosphoric acid is circulated through the jacket 8 at a temperature of 60° C., and at a rate of 1,260 ml./min. The flow pattern of the water in the jacket 8 is such that the hot water does not flow to the bottom of the jacket, and thus does not heat the tube 2. Milk which has been treated with a suitable starter culture and then renneted at pH 5.9 to 6.1 and 0° C. to 10° C. and held for about one hour, is pumped into the tube 2 at the rate of 80–90 ml./min. Curd forms in the heated portion of the tube 1, becomes detached from the wall and moves upwards carried by the flow of whey, which is exceeded from the curd. The curd leaving the top of the tube 1 has a temperature of 44° C. The curd, on emerging from tube 3, can be received into whey where it is held at scalding temperature or otherwise handled, for example, according to the processes normally employed according to the type of cheese required.

I claim:

1. A process for the continuous production of curd which comprises the steps of renneting milk at a temperature such that rennet action can occur without curd formation, holding the milk at that temperature at least until rennet action is nearing completion or is complete and contacting the renneted milk with one surface of a semi-permeable membrane, the other surface of which is in contact with water at elevated temperature so that the milk is heated to a temperature at which curd formation can occur.

2. A process according to claim 1 in which the renneted milk is contacted with the membrane in such a form that the milk is rapidly heated throughout its bulk to the required temperature.

3. A process according to claim 1 wherein the membrane is in the form of a tube through which the milk is caused to flow.

4. A process according to claim 1 wherein the membrane is in the form of a flat sheet.

5. A process according to claim 1 wherein renneted milk from a common source is contacted with a plurality of membranes arranged in parallel.

6. A process according to claim 5 wherein means are provided for ensuring that the rate of feed to each of the membranes is the same.

7. A process according to claim 1 wherein the membrane is formed from regenerated cellulose.

8. A process according to claim 1 wherein the membrane is formed from cellulose nitrate.

9. A process according to claim 1 wherein the pH of the milk is first adjusted to between 6.1 and 6.3.

10. A process according to claim 1 wherein the milk is first inoculated with a starter culture.

11. A process according to claim 1 wherein the milk is renneted at a temperature between 0 and 10° C.

12. A process according to claim 1 wherein the milk is heated while in contact with the membrane to a temperature between 30 and 50° C.

13. A process according to claim 1 wherein the water is acidified.

14. A process according to claim 1 wherein the water is acidified with phosphoric or hydrochloric acid.

References Cited

UNITED STATES PATENTS

| | | | |
|---|---|---|---|
| 1,503,892 | 8/1924 | Grindtod | 99—60 |
| 2,908,575 | 10/1959 | Spiess et al. | 99—116 |
| 2,917,827 | 12/1959 | Lankford | 99—115 X |
| 2,997,395 | 8/1961 | Berridge | 99—116 |

LIONEL M. SHAPIRO, Primary Examiner

D. M. NAFF, Assistant Examiner

U.S. Cl. X.R.

31—89; 99—20